United States Patent [19]

Charnitski et al.

[11] Patent Number: 5,278,625
[45] Date of Patent: Jan. 11, 1994

[54] METHOD AND APPARATUS FOR LATERAL REGISTRATION OF SEQUENTIAL IMAGES IN A SINGLES PASS, MULTI-LED PRINT BAR PRINTER

[75] Inventors: George A. Charnitski, Fairport; Jacob N. Kluger, Rochester, both of N.Y.

[73] Assignee: Xerox Corporation, Stamford, Conn.

[21] Appl. No.: 931,802

[22] Filed: Aug. 18, 1992

[51] Int. Cl.$^5$ .............................................. G03G 15/01
[52] U.S. Cl. ................................ 355/326 R; 346/157; 355/212; 355/317
[58] Field of Search ............... 355/317, 316, 326, 327, 355/211, 212; 346/157, 160, 155

[56] References Cited

U.S. PATENT DOCUMENTS

| | | | |
|---|---|---|---|
| 3,785,730 | 1/1974 | Weber et al. | 355/212 |
| 4,429,985 | 2/1984 | Yokota | 355/212 |
| 4,569,584 | 2/1986 | St. John et al. | 346/157 X |
| 4,660,059 | 4/1987 | O'Brien | 346/157 |
| 4,833,503 | 5/1989 | Snelling | 355/259 |
| 4,903,067 | 2/1990 | Murayama et al. | 355/326 X |
| 4,912,491 | 3/1990 | Hoshino et al. | 346/160 |
| 4,965,597 | 10/1990 | Ohigashi et al. | 355/327 X |
| 5,040,003 | 8/1991 | Willis | 346/157 |
| 5,225,877 | 7/1993 | Wong | 355/212 |

FOREIGN PATENT DOCUMENTS

| | | | |
|---|---|---|---|
| 54-99641 | 8/1979 | Japan | 355/317 |
| 63-48571 | 3/1988 | Japan | 355/317 |
| 63-48572 | 3/1988 | Japan | 355/317 |
| 63-300259 | 12/1988 | Japan | 355/317 |
| 1-178979 | 7/1989 | Japan | 355/317 |
| 1-185564 | 7/1989 | Japan | 355/317 |

*Primary Examiner*—A. T. Grimley
*Assistant Examiner*—Shuk Y. Lee

[57] ABSTRACT

An image bar recording system, which, in a preferred embodiment, utilizes a plurality of LED image bars, forms a plurality of latent images, which may subsequently be developed in different colors. The print bars are initially aligned so that each color image is in precise lateral registration on the surface of a photoreceptor belt. The registration is accomplished by first forming a Z-shaped pattern along the non-image edge of a photoreceptor belt, the pattern extending in the direction of the belt motion (process direction). Each print bar is positioned adjacent the belt surface and the pixels of the LED array are selectively energized to form the desired image. An array of non-imaging pixels is contiguous to the image-forming pixels and positioned along the belt so as to be periodically visible through the Z-shaped pattern by photosensors positioned beneath each of the print bars. By an iterative energization process, one of the end pixels of each array is identified as a fiduciary pixel lying at the center trace line of the Z-shaped pattern. Upon recognition of the fiduciary pixel, the system controller establishes a #1 write pixel at the other end of the array. Each bar is initially laterally aligned by enabling fiduciary and #1 pixels in the same manner. A predetermined tolerance is stored in system memory and in circuitry associated with detecting the position of the fiduciary pixel. During operation, if the tolerance is found to be exceeded (the fiduciary pixel is detected as no longer along the center trace line of the Z-shaped pattern), correction signals are generated which select a new fiduciary pixel which is within the tolerance range, the new fiduciary pixel also establishing a new #1 write pixel. The detection circuitry is designed to discriminate between the exceeding of tolerance conditions caused by lateral motion of a print bar or by lateral motion of the photoreceptor belt, and to generate the appropriate correction signals.

4 Claims, 5 Drawing Sheets

METHOD AND APPARATUS FOR LATERAL REGISTRATION OF SEQUENTIAL IMAGES IN A SINGLES PASS, MULTI-LED PRINT BAR PRINTER

BACKGROUND OF THE INVENTION AND MATERIAL DISCLOSURE STATEMENT

The present invention relates to registration of plural image exposures formed on a photoreceptor belt in a single pass by a plurality of LED print bars and, more particularly, to improvements in lateral registration by use of high resolution print bars.

Image print bars used in xerographic recording systems are well known in the art. The print bar generally consists of a linear array of a plurality of discrete light emitting sources. Light emitting diode (LED) arrays are preferred for many recording applications. In order to achieve high resolution, a large number of light emitting diodes, or pixels, are arranged in a linear array on a common substrate. The orientation of the print bar is transverse to the movement of the photoreceptor (transverse to the process direction). Each LED in a central, or image forming area of the array is used to expose a corresponding area on a moving photoreceptor to an exposure value defined by the video data information applied to the drive circuits of the print bars. The photoreceptor is advanced in the process direction to provide a desired image by the formation of sequential scan lines.

In one embodiment of a color xerographic printer, a plurality of LED print bars are positioned adjacent to a photoreceptor belt surface and selectively energized to create successive image exposures. If two bars are used, the system typically provides one highlight color and one black color. For full color, four bars are used, one for each of the three basic colors and a fourth print bar for black images.

When a full color system is implemented, each color image must be precisely aligned (registered) so that all corresponding pixels in each image area are registered. Current requirements are for registration tolerance of approximately 100μ. This is a cumulative total which includes 25μ for lateral motion of the photoreceptor, 25μ for the skew motion of the photoreceptor, and the remainder for the photoreceptor motion quality in the process direction and lateral belt motion (cross process direction). The present invention is directed towards a method and apparatus for improved registration of the print bar areas in the lateral or cross process direction.

There are several prior art techniques for registering multiple print bars in the lateral direction. Co-pending application U.S. Ser. No. 07/807,931, assigned to the same assignee as the present invention, discloses LED print bar registration techniques which utilize hole sensors to generate registration correction signals which are used to drive stepper motors which provide transverse and rotational motion to an associated image bar. Another U.S. Pat. No. 5,208,796, assigned to the same assignee as the present invention, discloses lateral registration techniques which include physical shifting of the print bar by operation of piezoelectric stacks. A still further co-pending application U.S. Ser. No. 07/862,150, assigned to the same assignee as the present invention, discloses lateral registration of print bars by use of pairs of oppositely aligned holes formed on the photoreceptor, beneath which are placed sensors which detect light from selected print bar pixels. The contents of these three applications are hereby incorporated by reference.

The present invention is directed towards an improved technique for obtaining lateral registration of multiple print bars in a single pass printer, which does not require mechanisms for lateral movement of the print bars to obtain registration nor the use of hole pairs on opposite sides of the photoreceptor belt. The invention isolates two tolerances, the pixel position and the lateral motion components (collective total of 50μ) and provides a print bar control system which establishes an initial registration for each print bar that places it within the 50μ tolerance, and then maintains print bar operation within that tolerance range by detecting subsequent lateral motion of the print bar and/or the photoreceptor and generate corrective signals within a control system to maintain the registration within the prescribed tolerances. More particularly, the present invention relates to a method for lateral registration of sequential images formed in a single pass on the surface of a photoreceptor belt moving in a process direction including the steps of:

(a) positioning a plurality of light emitting diode (LED) print bars in image-forming relation with respect to said belt, said print bar having a first linear segment of light emitting pixels which are selectively addressed to form said sequential images, said print bar having a second, non-image forming segment of light emitting pixels at one end contiguous to said image-forming segment, (b) forming a Z-shaped pattern at one end of the photoreceptor belt, said pattern comprising a first, second and third angled slot aperture aligned in the process direction, (c) moving the photoreceptor so that light from the non-image forming pixels is periodically visible through said slot apertures, as said belt moves the apertures past said print bars, (d) selectively energizing at least one of said non-image forming pixels of a first print bar, (e) detecting the passage of light through said apertures, (f) measuring the time between detection of the light passing through the first and second apertures passing beneath the instant energized pixel to establish a time $t_1$, (g) measuring the time between detection of the second and third apertures passing beneath the instant energized pixel to establish a second time $t_2$, (h) continuing selective energization of pixels in said end array unit $t_1 = t_2$, thereby establishing the instant energized pixel as a fiduciary pixel, (i) establishing a #1 scan pixel in said first linear segment, (j) repeating steps (d) through (i) for the second, third and fourth print bars, (k) establishing a tolerance value whereby $t_1$ is considered equal to $t_2$ in said step (h), (l) periodically repeating steps (d), (g) and (h) to detect a condition where $t_1$ is no longer equal to $t_2$ within the established tolerance for at least one print bar, and (m) establishing a new fiduciary pixel and a new start of scan pixel to return to the condition of $t_1 = t_2$ within the prescribed tolerance.

DESCRIPTION OF THE DRAWINGS

FIG. 1 shows a side view of the single pass, color printing system of the present invention having four exposure stations 10, 12, 14, 16, each station including an LED print bar 10A, 12A, 14A, 16A. FIG. 2 shows a top view of the system of FIG. 1, absent some of the xerographic stations, for ease of description. Referring to FIGS. 1 and 2, each print bar is selectively addressed by video image signals processed through controller circuit 15, to produce a modulated output which is coupled through a gradient index lens array 10B, 12B, 14B, 16B, onto the surface of previously charged photoreceptor belt 17. The length of belt 17 is designed to accept an integral number of full page image areas; e.g. $I_1$-$I_4$, represented by dashed lines. It is assumed that the lateral position of belt 17 is controlled to within $25\mu$ by means described in the above-identified applications. Upstream of each exposure station are charge devices 18, 19, 20, 21, (FIG. 1) which place a predetermined electrical charge on the surface of belt 17. As the belt moves in the direction of the arrow, each image area moves past each of the print bars, with each bar providing its own exposure pattern, in response to the video data input. The exposure pattern begins when the leading edge of an image area reaches a transverse start-of-exposure line, represented in image frame $I_1$ by a line 23. The exposure pattern is formed of a plurality of closely spaced transverse scan lines. Downstream from each exposure station, a development system 26, 27, 28, 29, develops a latent image of the last exposure without disturbing previously developed images. A fully developed color image is then transferred at transfer station 33, by means not shown, to an output sheet. Further details of xerographic stations in a multiple exposure single pass system are disclosed in U.S. Pat. Nos. 4,660,059 and 4,833,503, whose contents are hereby incorporated by reference.

Figure 1:
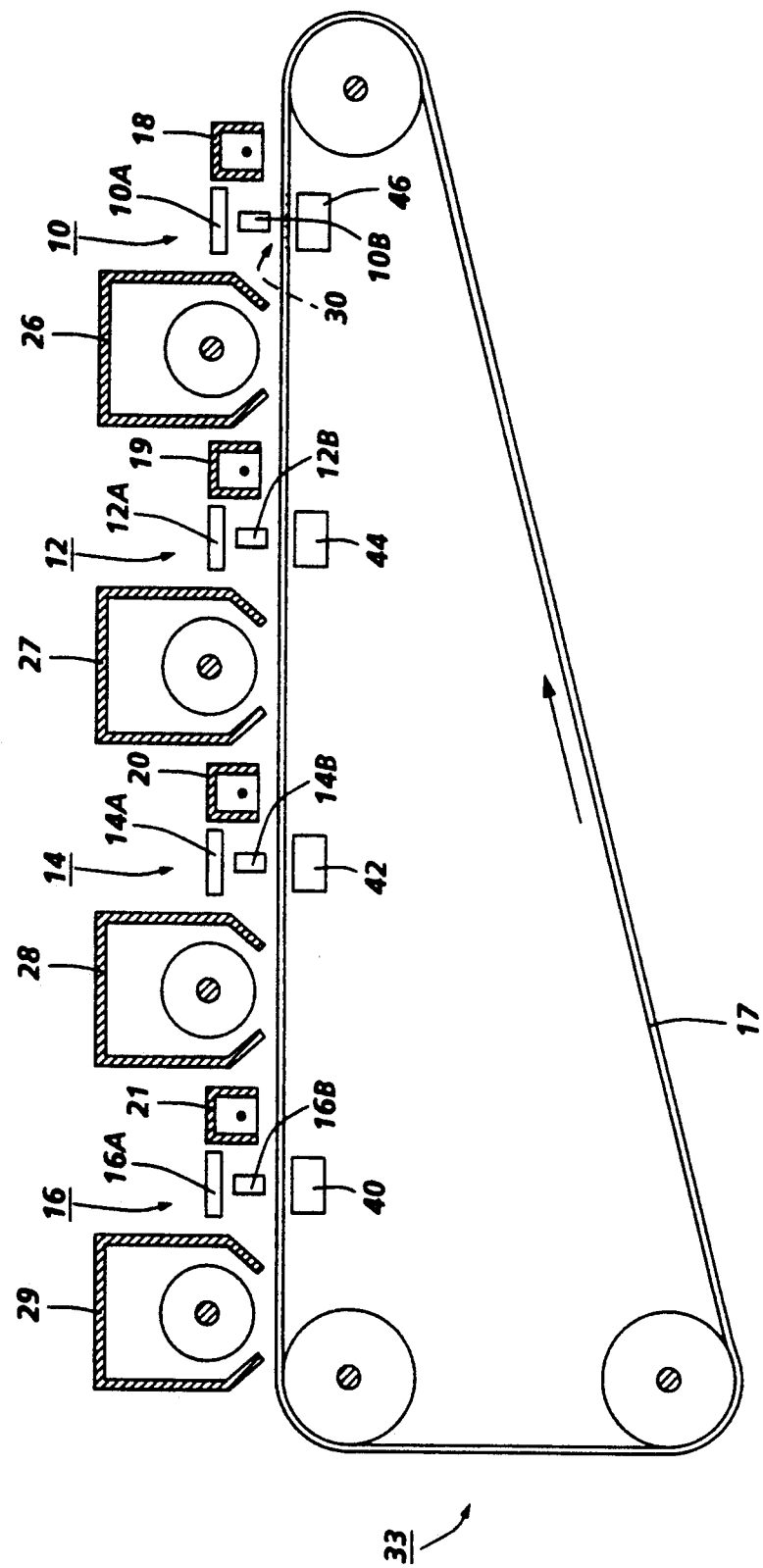
FIG. 1 is a side view of the single pass LED image bar printer of the present invention.
Figure 2:
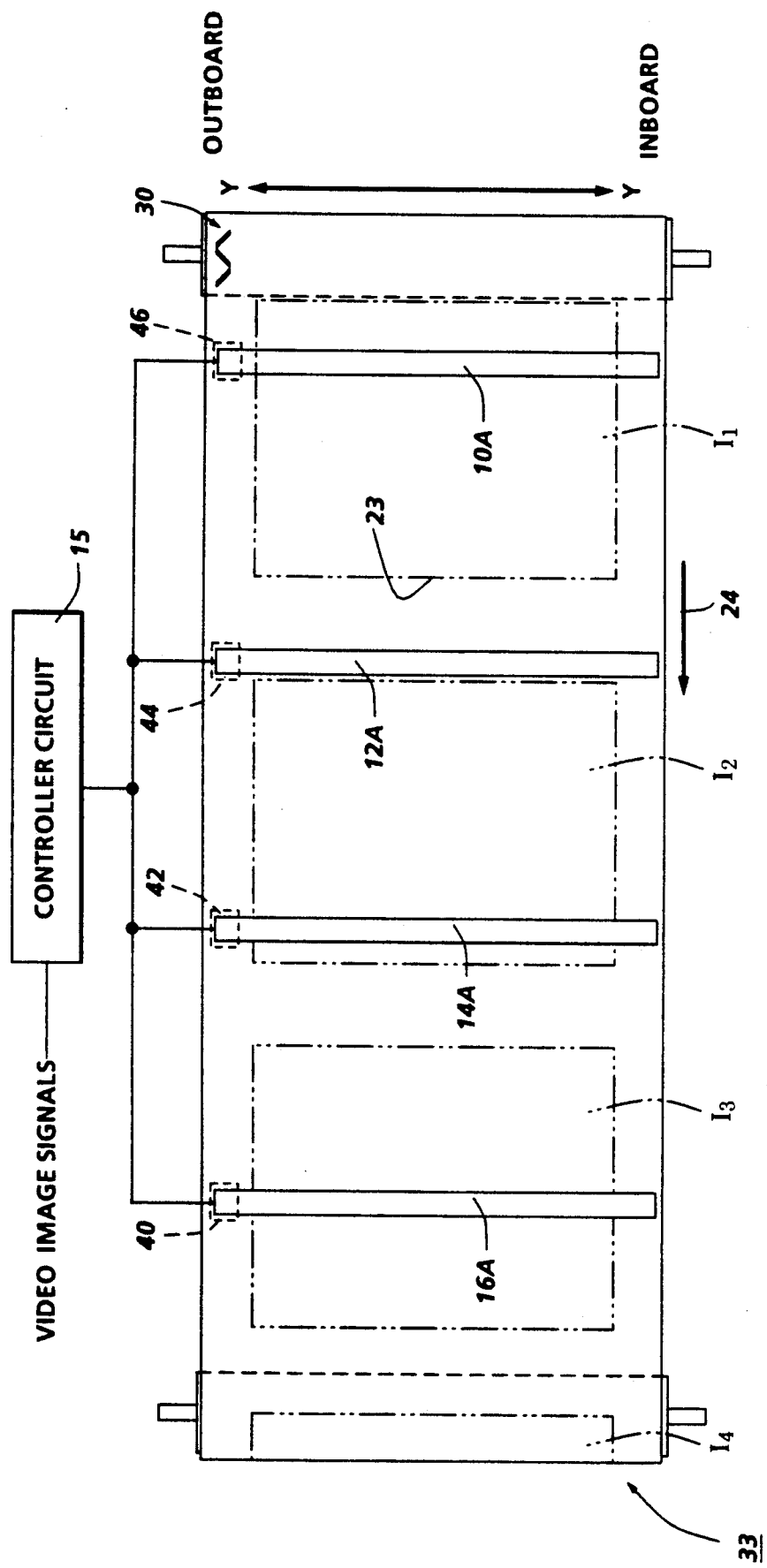
FIG. 2 is a top view of the printer of FIG. 1 omitting the xerographic station excepting the exposure station.

With such a system as that disclosed in FIGS. 1 and 2, each color image $I_1$-$I_4$ must be precisely aligned (registered) so that all corresponding pixels in the image areas are registered. The print bar alignment requirements are for $25\mu$, the pixels of each bar to be aligned in the lateral or Y-direction of FIG. 2, as well as the $25\mu$ for process or X-direction. This alignment must be maintained within this tolerance through continuous revolutions (passes) of the photoreceptor. Also, the accuracy of the pixel output formed at the photoreceptor is a function of the accuracy of the pixel placement on the print bar and the focusing tolerance of the associated lens array.

Continuing with the description of the system shown in FIGS. 1 and 2, a Z-shaped registration pattern 30 is formed in a non-image area of belt 17. Pattern 30 comprises a first, second and third angled slot aperture aligned in a process direction, whose function is disclosed in greater detail in conjunction with the description of FIG. 3. Fixed in place beneath each of the print bars are registration sensors 40, 42, 44, 46. Thus, print bar 10A has associated sensor 46, print bar 12A has sensor 44, print bar 14A, sensor 42 and print bar 16A, sensor 40. The sensors are used to detect the passage of pattern 30, coincident with the pulsing of predetermined pixels at the end of each image bar. Signals generated by each sensor are used to provide initial lateral registration and to maintain subsequent lateral registration.

In a preferred embodiment of the invention, print bars 10A, 12A, 14A, 16A, each comprise a linear array of pixels which emit radiation, when addressed, to form images at a 600 spots per inch (spi) resolution, focused by the associated lens array at the photoreceptor. As shown in FIG. 2, each print bar includes an image forming segment which overlies the image area $I_1$-$I_4$ and an end segment located at the outboard end which is outside the image area. Sensors 40-46 are PIN-type silicon detectors.

Figure 3:
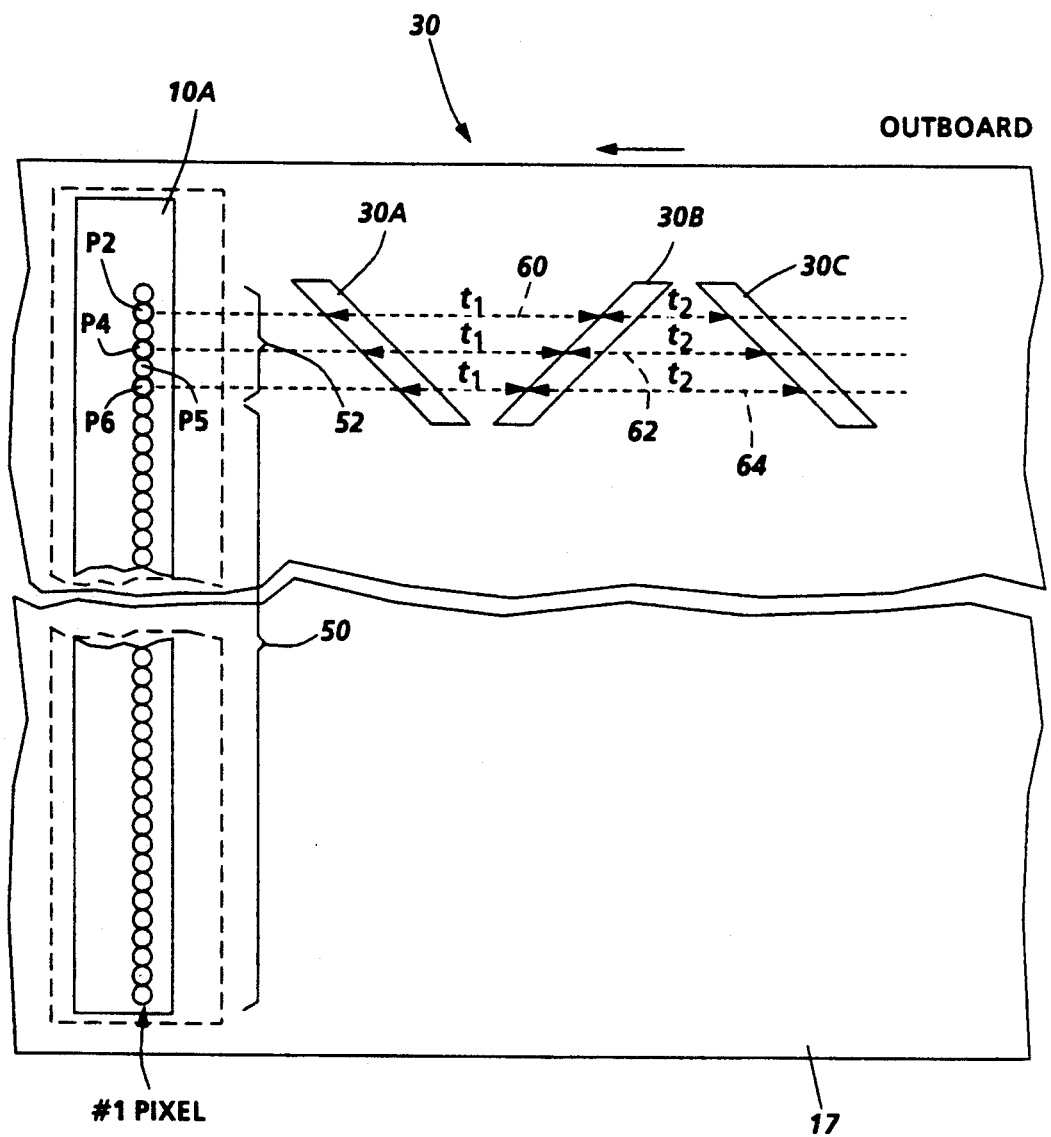
FIG. 3 is an enlarged view of a print bar location adjacent the photoreceptor belt.
Figure 4:
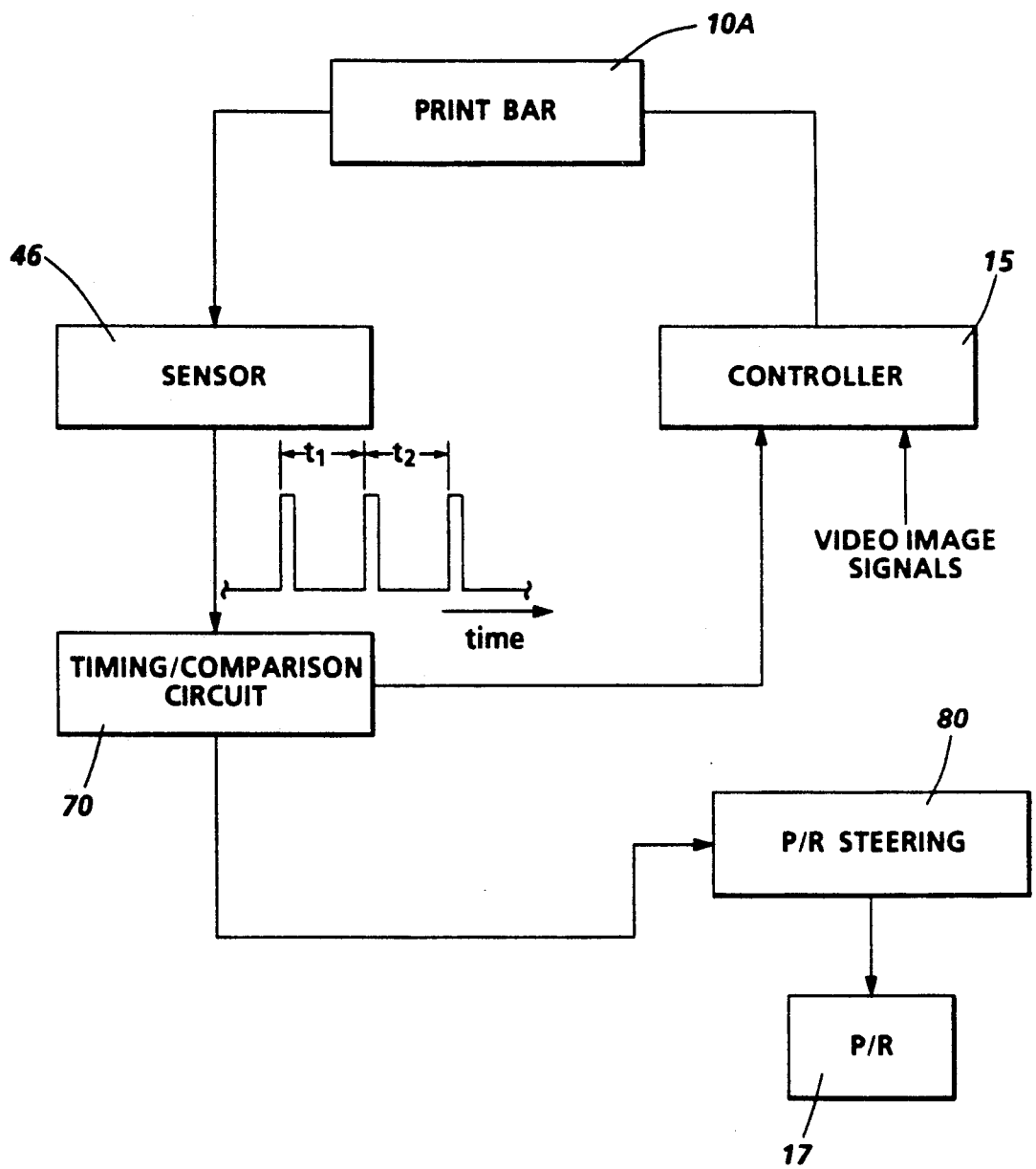
FIG. 4 is a block diagram of the control circuitry.

In an initial alignment procedure, belt 17 is moved in the process direction and each print bar is sequentially laterally registered as follows. Referring to FIG. 3, an enlarged view of the pattern 30 and print bar 10A of FIG. 2 is shown to facilitate a discussion of the manner in which the passage of pattern 30 is sensed and used to generate signals for lateral registration. As shown, pattern 30 consists of three angled slots 30A, 30B, 30C. Print bar 10A has a single array of pixels which include an image forming segment 50 and an end segment 52 outside the image area. Belt 17 is moved in the indicated direction with a first trial pixel, P2 energized. Pixel P2 will be visible at detector 46 successively through apertures 30A, 30B, 30C, producing three voltage pulses along a sensor trace path 60. Pixel P4 produces sensor trace path 62 and Pixel P6 path 64. Referring to the control circuit of FIG. 4, signals from sensor 46 are sent to a timing/comparison circuit 70. The circuit compares the output waveform signals over time to establish equality or lack of same between inter-signal times. The time between the first two pulses, which defines time $t_1$, and the time between the second two pulses, $t_2$, will determine the lateral position of the print bar 10A with respect to Z-shaped pattern 30. Under nominal conditions, $t_1$ and $t_2$ will be the same when a lit pixel transverses the center of the Z-shaped pattern. When the lit pixel is off center, $t_1$ will be different than $t_2$ and the difference value will indicate the deviation from the center and the sign of the difference will indicate in what direction; e.g. is $t_1 > t_2$ or is $t_1 < t_2$. In FIG. 3, the sensor trace path 60 shows the pixel path resulting when pixel 2 is on. Since the time difference between $t_1$ and $t_2$ indicates a greater than one pixel width difference, a signal is sent to controller 15 causing another pixel P3 to be illuminated. As shown, when pixel P4 is activated, the sensor trace path 62 traverses the center of the Z hole pattern ($t_1 = t_2$). Pixel P4 is then designated as the fiduciary pixel F1 for print bar 10A and the timing signal for this pixel is stored in controller 15 memory. Upon identification of pixel F1, controller 15 identifies the #1 pixel (first data pixel) of the image forming array 50. This pixel is a fixed preset distance from the fiduciary pixel F1.

Figure 5:
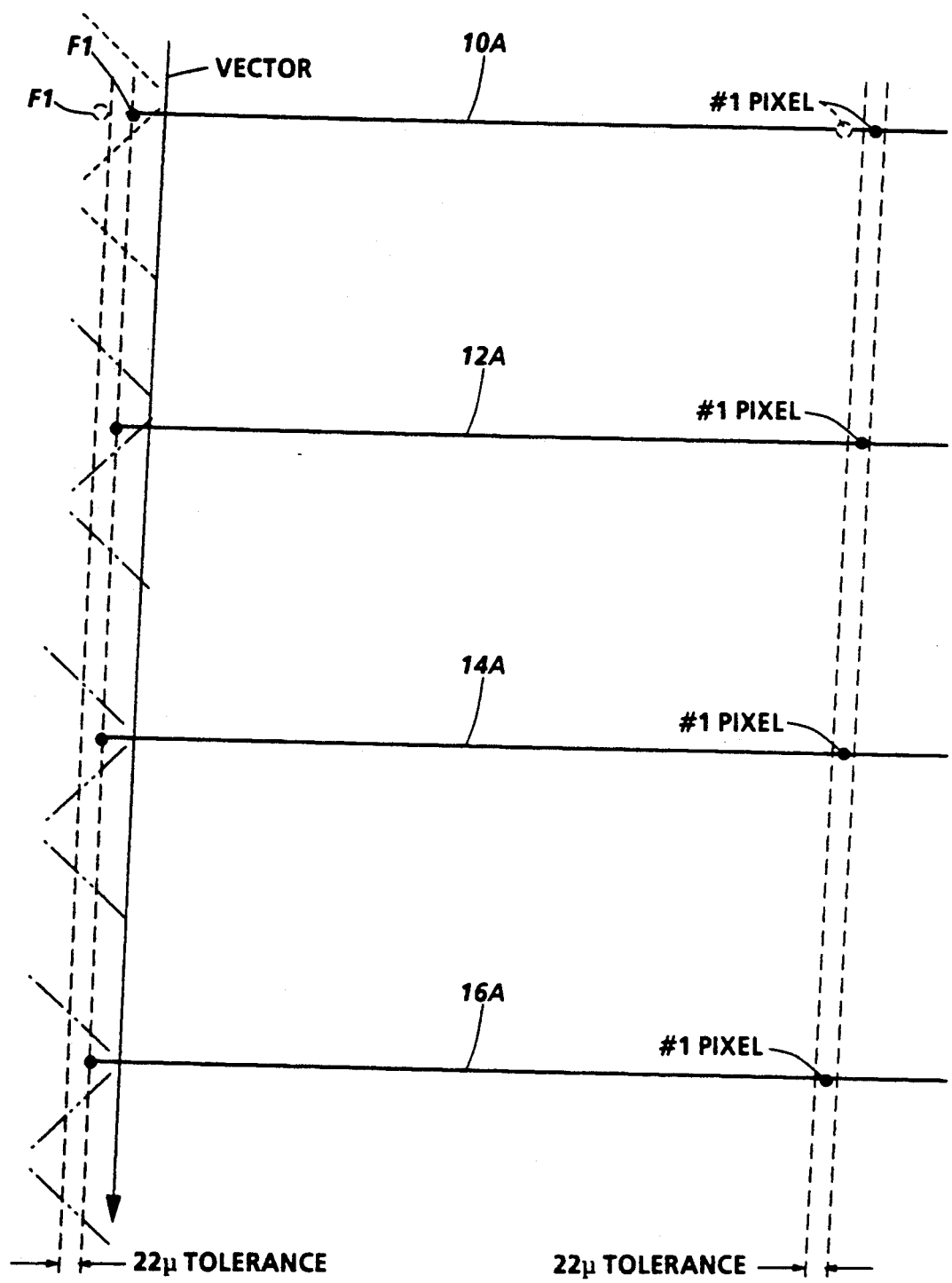
FIG. 5 is a top view of the belt showing location of fiduciary pixels for each print bar.

The photoreceptor motion continues carrying Z-shaped pattern 30 successively past print bars 12A, 14A, 16A, and the fiduciary pixel and the associated first data pixels are identified for each print bar; e.g. and pixel F2 for bar 12A, F3 for bar 14A and F4 for bar 16A. As shown in FIG. 5, all the fiduciary pixels and all the first pixels should be aligned within ½ of the center-to-center spacing of the pixels or about $22\mu$. With this initial alignment, the print bars are laterally registered within tolerance.

During operation, several changes to the system may occur. As a first example, one of the print bars may move laterally due to, for example, shifting of the printer housing. This motion will effect the position of the fiduciary pixels. The comparison circuit in timing-/comparison circuit 70 has been set to ignore $t_1-t_2$ differences smaller than 22μ. However, if the motion does position one or more of the fiduciary pixels beyond the 22μ limit, a correction is made to both the fiduciary and the number 1 pixel. As shown in FIG. 5, it is assumed that print bar 10A has been moved laterally in the outboard direction, causing pixel F1 to be placed outside of the 22μ limit. #1 pixel will be moved the same distance in the same direction. Upon detecting this out of tolerance shift, circuit 70 generates a signal to controller 15 to increment, or "jump" one-pixel in the opposite direction to minimize this error. Thus, from FIG. 3, the next pixel P5 is selected as the new fiduciary pixel and the next outboard pixel is identified as the new #1 pixel. Thus, print bar 10A would continue operation with this new fiduciary, #1 pixel pair. Similar corrections would be made for print bars 12A, 14A, 16A.

As a further feature, circuit 70 has sufficient discrimination and comparison circuitry to compare the readings for all four print bars and to recognize that if two print bars happen to move in the same direction and close to the same amount and these two happen to align near a third print bar, the circuit will increment the fiduciary pixel of the fourth print bar to match the other three. The intent is to maintain fiduciary pixels within a 22μ "envelope".

As a second example of the problem affecting lateral registration, the photoreceptor may begin to "walk" laterally in a linear fashion. The detection signal in this case will also vary linearly. For example, if the change in signal at bar 10A is 5μ, at bar 12A 10μ, at bar 14A 15μ, at bar 16A 20μ, this would indicate a belt walk condition as opposed to the constant change in signal resulting from a bar shift. For this example, once an out of spec reading at any bar is determined, the comparison circuit 70 is designed to identify this progression as a belt walk condition and generate a signal which is sent to the photoreceptor steering circuit 80, which generates an output to a stepper motor, or the like, for steering the belt back, by means not shown, so as to place the fiduciary pixel back into the tolerance position.

While the invention has been described with reference to the structures disclosed, it is not confined to the details set forth, but is intended to cover such modifications or changes as they come within the scope of the following claims.

What is claimed is:

1. A method for lateral registration of sequential images formed in a single pass on a surface of a photoreceptor belt moving in a process direction including the steps of:
   (a) positioning a plurality of light emitting diode (LED) print bars in image-forming relation with respect to said belt, said print bars each having a first linear segment of light emitting pixels which are selectively addressed to form said sequential images, said print bar having a second, non-image forming segment of light emitting pixels at one end contiguous to said image-forming segment,
   (b) forming a Z-shaped pattern at one end of the photoreceptor belt, said pattern comprising a first, second and third angled slot aperture aligned in the process direction,
   (c) moving the photoreceptor belt so that light from the non-image forming pixels is periodically visible through said slot apertures, as said belt moves the apertures past said print bars,
   (d) selectively energizing at least one of said non-image forming pixels of a first print bar to produce a light output,
   (e) detecting the passage of the light output through said apertures,
   (f) measuring time between detection of the light output passing through the first and second apertures passing beneath an instant energized pixel to establish a time $t_1$,
   (g) measuring time between detection of the second and third apertures passing beneath the instant energized pixel to establish a second time $t_2$,
   (h) continuing selective energization of pixels in said non-image forming segment until $t_1=t_2$, thereby establishing the instant energized pixel as a fiduciary pixel,
   (i) establishing a #1 scan pixel in said first linear segment which is a predetermined distance from the fiduciary pixel,
   (j) repeating steps (d) through (i) for each of the plurality of print bars after the first,
   (k) establishing a tolerance value whereby $t_1$ is considered equal to $t_2$ in said step (h),
   (l) periodically repeating steps (d), (g) and (h) to detect a condition where $t_1$ is no longer equal to $t_2$ within the established tolerance for at least one print bar, and
   (m) establishing a new fiduciary pixel and a new start of scan pixel to return to the condition of $t_1=t_2$ within the prescribed tolerance.

2. The method of claim 1 including the further steps of detecting a linear deviation of $(t_1-t_2)$ value and generating a corrective signal to enable a steering correction to be made to the photoreceptor belt.

3. An apparatus for lateral registration of sequential images formed in a single pass on a surface of a photoreceptor belt moving in a process direction including:
   (a) a plurality of light emitting diode (LED) print bars positioned in image-forming relation with respect to said belt, said print bars each having a first linear segment of light emitting pixels which are selectively addressed to form said sequential images, said print bars having a second, non-image forming segment of light emitting pixels at one end contiguous to said image-forming segment,
   (b) a Z-shaped pattern at one end of the photoreceptor belt, said pattern comprising first, second and third angled slot apertures aligned in the process direction,
   (c) means for moving the photoreceptor belt so that light from the non-image forming pixels is periodically visible through said slot apertures, as said belt moves the apertures past said print bars,
   (d) means for selectively energizing at least one of said non-image forming pixels of a first print bar,
   (e) means for detecting passage of light through said apertures and for generating output signal representative thereof,
   (f) circuit means for measuring time between detection of the light passing through the first and second apertures passing beneath the instant energized pixel to establish a time $t_1$ and for measuring time between detection of the second and third apertures passing beneath the instant energized pixel to establish a second time $t_2$, and (h) comparison means for identifying a condition where $t_1 = t_2$, said comparison means generating an output signal to establish a fiduciary pixel in said non-image forming segment and a #1 pixel in said image forming segment which is a predetermined distance from the fiduciary pixel.

4. The apparatus of claim 3 wherein said comparison means detects a linear deviation of the difference between $t_1$ and $t_2$ over a series of measurements and generates a photoreceptor belt steering correction signal.

* * * * *